US012479629B1

(12) United States Patent
Claytor

(10) Patent No.: US 12,479,629 B1
(45) Date of Patent: Nov. 25, 2025

(54) DEVICES AND METHODS FOR APPLICATION OF A COVER TO AN OPENING OF VARIABLE SIZES

(71) Applicant: Hygenix LLC, Kirkwood, MO (US)

(72) Inventor: Samuel W. Claytor, Carbondale, CO (US)

(73) Assignee: Hygenix LLC, Kirkwood, MO (US)

( * ) Notice: Subject to any disclaimer, the term of this patent is extended or adjusted under 35 U.S.C. 154(b) by 0 days.

(21) Appl. No.: 19/013,419

(22) Filed: Jan. 8, 2025

(51) Int. Cl.

| | |
|---|---|
| ***B65D 41/22*** | (2006.01) |
| ***A24F 9/16*** | (2006.01) |
| ***F16L 55/115*** | (2006.01) |
| *A24F 1/30* | (2006.01) |
| *A24F 9/04* | (2006.01) |

(52) U.S. Cl.
CPC ................ *B65D 41/22* (2013.01); *A24F 9/16* (2013.01); *B65D 41/225* (2013.01); *F16L 55/115* (2013.01); *A24F 1/30* (2013.01); *A24F 9/04* (2013.01); *A24F 2700/08* (2013.01); *B65D 2251/02* (2013.01); *B65D 2251/08* (2013.01); *B65D 2543/00842* (2013.01)

(58) Field of Classification Search
CPC ...... A24F 3/02; A24F 9/04; A24F 9/08; A24F 9/16; A24F 2700/08; B65D 41/22; B65D 41/225; B65D 51/007; B65D 79/0087; B65D 2251/08; B65D 2543/00842; F16L 55/115; F16L 55/1286
USPC .................. D9/443; D23/260; 215/317, 319; 220/287, 305, 380, 782, 793, 805, 220/DIG. 19
See application file for complete search history.

(56) References Cited

U.S. PATENT DOCUMENTS 1,093,735 A * 4/1914 Samuel .............. B65D 79/0087 220/DIG. 19
1,365,295 A * 1/1921 Townsend .............. B65D 41/02 215/317

(Continued)

OTHER PUBLICATIONS

Ooze Resolution Silicone Res Cap 4-Pack for Travel and Cleaning—Black. Product Listing [online]. Cannatron (Ooze Wholesale), Jun. 26, 2022 <https://www.oozelife.com/collections/bong-cleaning-supplies/products/ooz-1014-ooze-accessories-ooze-resolution-black>. (Year: 2022). Retrieved from Internet Archive Wayback Machine <https://web.archive.org/web/20220626075637/https://www.oozelife.com/collections/bong-cleaning-supplies/products/ooz-1014-ooze-accessories-ooze-resolution-black> on Jul. 29, 2025. (Year: 2022).*

(Continued)

*Primary Examiner* — Kenneth Rinehart
*Assistant Examiner* — Richard K. Durden
(74) *Attorney, Agent, or Firm* — Bonini IP Law, LLC; Frank J. Bonini, Jr.

(57) ABSTRACT

A cap device and method for covering openings of different sizes on a structure, such as for example smoking apparatus, are provided. The cap device comprises a cap having at least one elastic portion or area that is stretchable over an opening of the smoking apparatus to form a seal over the apparatus opening, which for smoking devices, can seal the opening to contain a cleaning solution within the smoking apparatus. The cap has grasping portions for a user to hold it simultaneously while stretching it over an opening on a smoking device. The cap device is easily removable when the cleaning is completed, and the opening of the structure no longer needs to be covered.

25 Claims, 8 Drawing Sheets

(56) References Cited

U.S. PATENT DOCUMENTS

| | | | | | |
|---|---|---|---|---|---|
| 1,439,170 | A * | 12/1922 | Kawasaki | B65D 47/2031 215/295 |
| 1,541,727 | A * | 6/1925 | Meyer | A24F 9/16 131/176 |
| 1,675,170 | A | 6/1928 | Ehmann | |
| 2,718,322 | A * | 9/1955 | Wilcox | B65D 41/22 215/253 |
| 2,922,563 | A * | 1/1960 | Aldington | B65D 43/0212 206/508 |
| 3,112,841 | A * | 12/1963 | Martinelli | B65D 43/021 D9/439 |
| 3,379,327 | A * | 4/1968 | Link | B65D 41/485 215/320 |
| D258,496 | S * | 3/1981 | Ludwig, Jr. | D9/439 |
| 4,346,816 | A * | 8/1982 | Caille | B65D 43/0212 220/782 |
| D276,598 | S * | 12/1984 | Bagwell | D9/443 |
| 4,538,741 | A * | 9/1985 | Jacobs | B65D 41/22 220/795 |
| 4,576,306 | A * | 3/1986 | Kelsey | B65D 17/506 220/375 |
| 4,815,628 | A * | 3/1989 | Wehnert, III | B65D 51/20 220/796 |
| 4,901,881 | A * | 2/1990 | McElroy | B65D 51/00 215/229 |
| 5,150,528 | A * | 9/1992 | Shire | G02B 23/16 42/129 |
| 5,165,562 | A * | 11/1992 | Raney | B65D 43/0216 220/792 |
| 5,996,833 | A * | 12/1999 | Lencioni | B65D 41/62 220/270 |
| 6,260,729 | B1 | 7/2001 | Mitchell et al. | |
| D475,925 | S * | 6/2003 | Sturk | D9/446 |
| 2006/0021991 | A1 * | 2/2006 | Liu | B65D 43/0212 220/780 |
| 2007/0131701 | A1 * | 6/2007 | Herbert | B65D 21/0233 220/826 |
| 2011/0008557 | A1 * | 1/2011 | Zeyfang | F16L 55/1141 428/36.8 |
| 2012/0247607 | A1 * | 10/2012 | MacNeill | F16L 55/115 138/96 R |
| 2012/0318815 | A1 * | 12/2012 | Kooney | B65D 43/0212 220/780 |
| 2015/0360827 | A1 * | 12/2015 | Ting | B65D 41/0485 215/305 |
| 2019/0144170 | A1 * | 5/2019 | Mouler | B65D 51/245 426/106 |
| 2020/0221764 | A1 | 7/2020 | Sheets | |

OTHER PUBLICATIONS

Ooze Resolution Silicone Res Cap 4-Pack for Travel and Cleaning—Green. Product Listing [online]. Cannatron (Ooze Wholesale), Mar. 27, 2023 <https://www.oozelife.com/products/ooz-1013-ooze-accessories-ooze-resolution-green>. (Year: 2023). Retrieved from Internet Archive Wayback Machine <https://web.archive.org/web/20230327105719/https://www.oozelife.com/products/ooz-1013-ooze-accessories-ooze-resolution-green> on Jul. 29, 2025. (Year: 2023).*

Siliclab Water Pipe Caps ("Wholesales Custom Logo Smoking Kit Smoking Pipe Cap Cleaning Silicone Caps Smoking Accessories "). Product Listing [online]. Siliclab (Shenzhen Siliclab Technology Co., Ltd.), 2025 [retrieved on Jul. 29, 2025]. (Year: 2025). Retrieved from the Internet: <URL:https://siliclab.en.made-in-china.com/product/GwTfbmQPqjWU/China-Wholesales-Custom-Logo-Smoking-Kit-Smoking-Pipe-Cap-Cleaning-Silicone-Caps-Smoking-Accessories.html>. (Year: 2025).*

Green Piece® Universal Plug Caps. Green Piece, Amazon.com Product Listing (ASIN B08SYJZ9D4), First Available Jan. 14, 2021 [retrieved on Jul. 29, 2025]. Retreived from the Internet: <URL: https://www.amazon.com/Green-Piece-Universal-Cleaning-Carrying/dp/B08SYJZ9D4/>. (Year: 2025).*

Hell's Glass Gallery, "Stem Clenz ~ Cleaning Caps", Website, Dec. 19, 2024, https://hellsglassgallery.com/products/stem-clenz-cleaning-caps.

* cited by examiner

DEVICES AND METHODS FOR APPLICATION OF A COVER TO AN OPENING OF VARIABLE SIZES

BACKGROUND OF THE INVENTION

1. Field of the Invention

This present invention relates to the field of cleaning smoking devices, and more specifically to devices and methods for securely covering the openings of such devices to facilitate efficient and safe cleaning.

2. Brief Description of the Related Art

Smoking from water pipes has become increasingly popular, replacing other methods of inhalation such as rolled paper cigarettes, dry pipes, and other traditional devices. Glass water pipes are widely available, with numerous artists and manufacturers offering a variety of designs. These devices typically function using two primary openings: the mouthpiece and the joint (where a slide or downstem is inserted).

When in use, glass water pipes accumulate a sticky resinous film on their interior surfaces. If left uncleaned, this film can harbor bacteria, molds, fungi, and other particulates. Over time, these contaminants lead to unpleasant odors, poor taste, and potential health risks. To maintain hygiene and functionality, users must clean these devices regularly.

Currently, cleaning methods are rudimentary and inefficient. Users typically attempt to cover the openings with their hands while shaking the device to distribute a cleaning solution. However, this method often fails to create a proper seal, leading to leaks and exposing the user's skin to potentially harsh cleaning agents. Alternatively, some users choose to soak the entire device in a cleaning solution, a process that is cumbersome, expensive, and unsuitable for larger devices.

Due to these challenges, many users neglect cleaning their water pipes entirely, leaving them contaminated for extended periods. These devices are frequently constructed of glass. Glass fragility further complicates cleaning, as excessive force or improper handling may result in breakage. Some users have reported not cleaning their devices for years, citing the difficulty and risks involved.

Existing solutions, such as caps or stoppers for sealing the openings of smoking devices, are either difficult to apply, incompatible with varying sizes, or fail to provide a reliable seal. In addition, these existing caps or stoppers are often difficult to apply over the opening, and the effort required can lead to slippage of the smoking device, and potential breakage of the glass. The lack of effective cleaning solutions has created a need for a device that is safe, easy to use, and adaptable to the diverse range of water pipe designs available on the market.

A cleaning system is disclosed in US patent application 2020/0221764, which relates to a carbon residue cleaning system comprising a cleaning solution provided in a container. The cleaning solution is disposable into a chamber of a smoking paraphernalia to clean a surface therein. The system includes a first cap and a second cap configured to engage with the smoking paraphernalia. U.S. Pat. No. 6,260,729 discloses a highly elastic sealing cover for covering food containers or dishes. The '729 device is designed to replace existing rigid covers or plastic wrap/aluminum foil. The '729 device is disclosed to be elastic and designed to provide a more air tight seal than plastic wraps or aluminum foil on a wide range of sizes and shapes of dishes or other food storage items. U.S. Pat. No. 1,675,170 discloses an improved milk bottle cap which is inexpensive to manufacture, is easy to apply to the bottle, effectively seals the contents of the bottle in a highly sanitary way, and maintains such seal even when the contents freeze and expand beyond the top of the same.

A need exists for an improved method and devices that are easy to apply and remove to an opening of a device that requires one or more openings to be covered so that contents may be contained within the device, during cleaning of the device with liquid cleaners or solutions.

SUMMARY OF THE INVENTION

The invention provides caps and methods for covering openings of different sizes on a structure. The inventive caps and methods may be used to cover openings of a structure such as a smoking apparatus, for example, a water pipe, glass pipe or other pipe type. According to embodiments, the invention comprises a cap having at least one elastic portion or area that is stretchable so it can be positioned over an opening of the smoking apparatus to form a seal over the apparatus opening. The cap has grasping portions for a user to hold simultaneously while stretching the cap over an opening on a smoking device. This may be done during a cleaning process of cleaning the smoking apparatus, which involves admitting a cleaning solution to the smoking apparatus interior chamber, and covering the smoking apparatus openings to seal the opening and contain the cleaning solution within the smoking apparatus chamber. The user can then shake the apparatus while the applied caps seal the openings to minimize or prevent leakage of the cleaner from exiting the chamber. The cap device is easily removable when the cleaning is completed, and the opening of the structure no longer needs to be covered.

The invention addresses existing challenges with cleaning devices on the market by providing an easy-to-apply cleaning cap designed for securely sealing the openings of glass water pipes. According to preferred embodiments, the inventive devices are configured as a stretchable cap or cover. The stretchable cover or cap is elastic and can be stretched over an opening of the device being covered, such as the glass smoking accessory. According to some preferred embodiments, the cap device comprises a cap body, which is a central portion of the cap that stretches over the opening to make a secure seal. The cap opening preferably is smaller than the smoking device over which it is to be installed, so once stretched over the opening, it is biased to return to its unstretched condition, and therefore makes a seal against the area near the device opening, such as a device neck or body.

The inventive caps are configured to fit on a wide range of mouthpiece shapes on presently available smoking devices. The inventive caps preferably have a shape that is designed to fit openings that are encountered on smoking devices, such as for example the openings of glass water pipes.

According to preferred embodiments, embodiments of the inventive cap include components to facilitate installation and removal of the cap. The installation facilitating components may comprise an end that is configured to facilitate holding the cap and stretching the cap to allow at least the body containing the opening to expand or enlarge to fit over a structure to which the cap is being applied. One or preferably both ends of the cap may include a holding element. According to some preferred embodiments, the inventive cap holding element may comprise an opening at one end in which a user may place the user's appendage, such as a finger or thumb, to secure the end of the device. The opening or hole allows a user to stabilize the cap during application by inserting their thumb or finger. The opening or hole may contain a textured grip for ergonomic enhancement and to add a further tactile aspect to the cap. A second holding element may be provided, and preferably is situated at the end opposite where the first holding element is located. The holding element, such as the second holding element, may comprise a pull tab, which, according to some preferred embodiments, is an ergonomically designed, reinforced tab structure that aids the user in stretching the cap body over the opening with ease. According to some embodiments, the pull tab may also optionally contain a textured grip for ergonomic enhancement and to add a further tactile aspect to the cap. Other configurations of the holding elements may be provided to facilitate a user installing and stretching the cap or one of its ends over the opening it is being installed to cover.

According to preferred embodiments, the cap is constructed from a durable yet flexible material, and one that may stretch and return to its initial condition. For example, according to some exemplary embodiments, the cap may be constructed from flexible silicone, which possesses suitable elasticity, durability, and ability to conform to a variety of shapes and sizes.

The cap may be provided with different zones of stretchability. According to some preferred embodiments, the cap body may have one or more areas or zones that are stretchable to accommodate varying dimensions, compared to the ends where the holding elements are located, and which may lead from those ends to the cap body. This stretchable area or areas may be provided by having a thinner wall or structural thickness. For example, preferably the holding elements, such as for example, the tab and opening are reinforced with additional thickness of the material to enhance durability and also to prevent tearing during use and reuse. According to some preferred embodiments the body or area that stretches to fit over an opening may have greater relative elasticity compared with other portions of the cap (such as the grasping or end portions).

The improved design of the inventive cap enables users to apply the cap while maintaining a secure grip on the smoking device, such as a water pipe, thereby reducing the risk of accidental slippage or breakage. This ease of use also is designed to encourage more frequent cleaning, promote better hygiene and reduce health risks. Additionally, the inventive cap design makes it accessible to a broader range of users, including individuals who are faced with a disability, such as, for example, those with limited dexterity or the use of only one hand, as these individuals can alternatively pull the tab in another manner, for example, with their teeth, if required and able.

The invention provides a cleaning cap designed to securely cover the openings of structures, such as for example, smoking water pipe devices during cleaning. The inventive cap devices solve the common problems of leakage, difficulty in application, and accidental slippage, for all users, and particularly facilitates ease of use for individuals with limited dexterity or strength.

According to preferred embodiments, the cleaning cap can be applied to a device, such as a smoking device, in several steps. Preferably, the user will first empty any existing liquid from the device to be covered, such as for example a smoking pipe, then the user will fill the pipe with the desired cleaning solution. Next, the user selects the appropriately sized cap based on the dimensions of the device opening. The user places the user's thumb through the opening to stabilize the cap and keep it in place during gripping of the device. The user preferably will grip the smoking device with the same hand that the user uses to grasp the ring or opening of the cap device. The user will then use another body part, such as the user's other hand, or the user's teeth, to hold the opposite end of the cap (the end opposite the ring end being held with the other hand), and stretch the cap over the smoking device opening. The cap then, once stretched over the smoking device opening, is released or allowed to recede back toward the opening, where it engages the glass smoking device and clings to the wall of the glass smoking device.

These and other advantages may be realized with the invention, and features shown and/or described in conjunction with one embodiment may be provided on other embodiments, alone or in combination with other features.

BRIEF DESCRIPTION OF THE DRAWING FIGURES

DETAILED DESCRIPTION OF THE PREFERRED EMBODIMENTS

Figure 1:
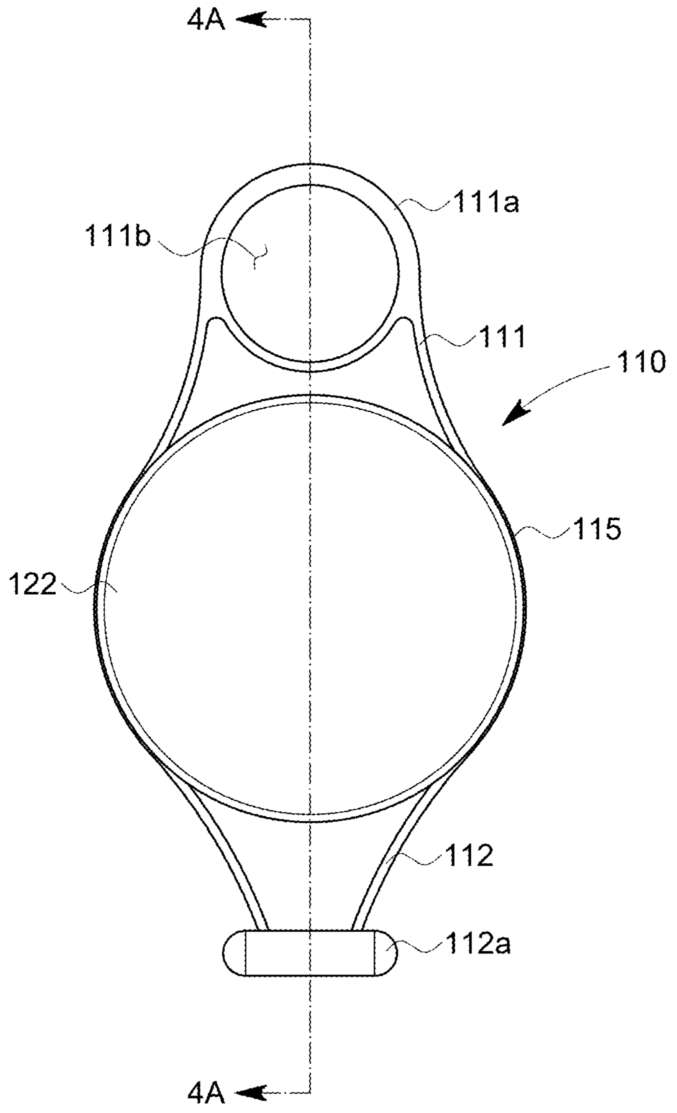
FIG. 1 is a top plan view of an example of a cap according to the invention.

Referring to FIGS. 1-4B, a cap device 110 according to an embodiment of the invention is shown. The cap device 110 also may be referred to herein as a cap. The cap device 110 is further depicted in a series of figures, FIGS. 5 and 6A-6F, and 7, which show the cap 110 in stages of installation onto and removal from a structure to be covered thereby, which in the illustrations depicted is a glass smoking device 500.

The cap device 110 may be used as a cleaning cap for application to a glass smoking device, such as a waterpipe, to cover the openings during a cleaning process. The cap 110 may be supplied in different sizes, with different opening dimensions to accommodate different size structures onto which the cap 110 is to be installed. A suitable number of caps may be used to cover the openings of a structure, such as for a glass water pipe having two (or more) openings, where a plurality of caps, which may be different sized caps, are installed to cover a respective plurality of openings.

The cap 110 preferably is configured with at least one element at an end thereof to facilitate handling and grasping of the cap, particularly during installation and removal over an opening of a structure, such as an opening of a glass smoking apparatus. According to preferred embodiments, there is preferably a grasping portion or element on each side of the cap, which may be provided at each cap end, to facilitate grasping and handling of the cap device 110. As shown in the exemplary embodiment, the cap 110 is shown having a first grasping portion comprising a first end 111, which is configured to comprise a loop 111*a*. The cap 110 preferably includes a second grasping portion comprising a second end 112 that includes a grasping element. In the embodiment illustrated, the second end of the cap 110 includes the second grasping end 112. The grasping end 112 includes a grasping element configured to comprise a tab 112*a*. Optionally, the second grasping end 112 and/or first grasping end, including the loop 111*a*, optionally may be provided with a textured surface or grip to facilitate gripping. The loop 111*a* and tab 112*a* provide features that aid in securing and handling the cap ends, as well as to facilitate stretching the cap or portion thereof, as these ends provide elements that may be held by a user. Although some embodiments may be provided with a grasping element at one end only (e.g., such as a tab end or a loop end), according to the preferred embodiments, the cap includes a grasping element at each end thereof. In the exemplary embodiment illustrated, the grasping portions 111, 112 are provided at opposite sides of the body 115. According to the preferred embodiment depicted, the grasping elements include the tab 112*a* of the second grasping portion 112 and the at least one loop 111*a* of the first portion 111. The grasping end allows for application of the cap to a structure by individuals with limited dexterity. The grasping end also allows for a dedicated spot to grab and stretch the cap over the mouthpiece 501 (see FIGS. 6A through 6F and 7). Although in the exemplary embodiment of the cap 110, a single loop 111*a* is shown, according to some other embodiments, there may be other numbers of loops (e.g., such as two or three). In addition, although the second grasping end is configured as a tab 112*a*, according to some alternate embodiments, other configurations for the second end grasping element may be provided, such as, for example, another loop that will provide suitable grasping. Additionally, while the tab and loop are shown provided at the ends, they may be provided at different locations on the grasping portions that extend from the body. The grasping portions 111, 112 are shown in the exemplary embodiment of the cap 110 in a preferred configurations, where they are located on opposite sides of the cap 110, situated about 180 degrees from each other. However, according to some alternate embodiments, the grasping portions 111, 112 may be situated or offset from one another at other orientations relative to the body portion 115, that provide suitable grasping and handling of the ends for stretching the cap over a structure.

In the exemplary embodiment depicted, the cap device 110 is shown having a second grasping end 112 comprising the tab 112*a*.

The cap 110 is configured having a body portion 115 that includes a first wall portion 116 and a second wall portion 117. A constricted area 118 (see FIGS. 3, 4A and 4B) is provided between the juncture 120 of the wall portions 116, 117. The body portion 115 includes an opening 121 which, in the embodiment illustrated, is formed at the constriction area 118. The opening 121 is shown preferably configured as a central opening. The cap 110 also includes a top surface 122, which in the cap embodiment depicted is shown connecting to the first wall portion 116. The cap body 115 is stretchable, and may be stretched to enlarge the cap opening 121 to fit over a structure, such as the open end of a water pipe. For example a structure to which the cap 110 is installed may have one or more openings, and to seal the openings, a plurality of caps, such as the cap 110 may be installed at each opening. The cap 110 may be provided having different sizes to accommodate different sizes of openings in a structure to which the cap is installed. The cap 110 being elastic may be installed on a range of structure sizes, and other sizes of caps may be installed on other ranges of structure sizes (e.g., such as a larger opening versus a smaller opening). The cap body 115 and opening 121 expand to fit over the structure.

Figure 2:
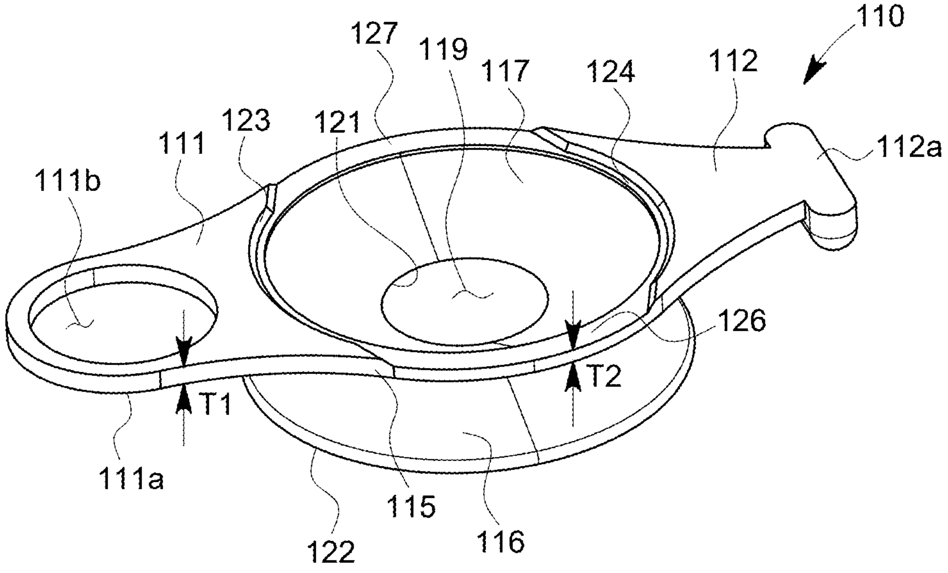
FIG. 2 is a perspective view looking from the bottom of the cap shown in FIG. 1, as viewed from an end of the cap looking from above.
Figure 3:
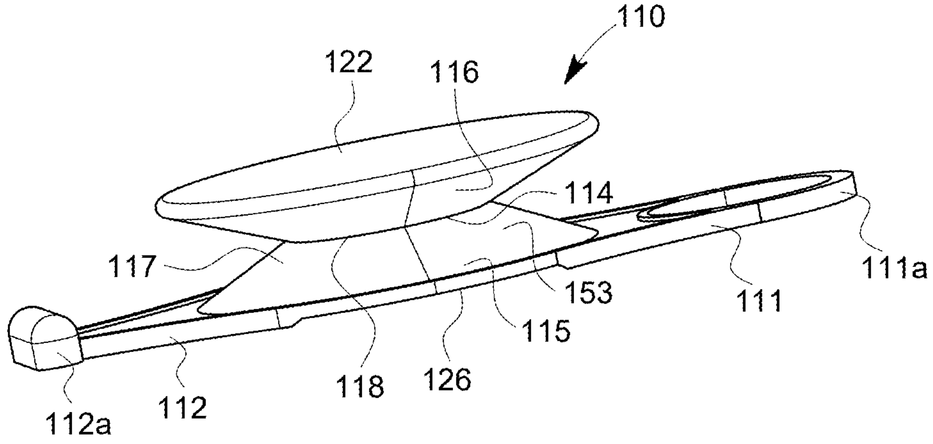
FIG. 3 is a side view of the cap of FIG. 1.

Referring to FIG. 2, the device body portion 115 includes a first shoulder 123 provided where the first grasping end 111 joins the body 115, and a second shoulder 124 provided where the second grasping end 112 joins the body 115. Each shoulder 123, 124 is shown adjacent to the sloped second wall portion 117. The second wall portion 117 is preferably sloped or angled to facilitate and encourage the movement of the cap 110 onto a structure, such as for example, the end or mouthpiece 501 of the glass smoking pipe 500 shown in FIGS. 6A-6F and 7. The angle of the wall 117 is shown leading to the opening 121 from the edge or shoulders 123, 124, and preferably is angled inward toward the cap top 122, with an upward slope. The first wall 116 is angled in direction opposite of the of the second wall 117, and is angled or sloped inward and downward.

Figure 4A:
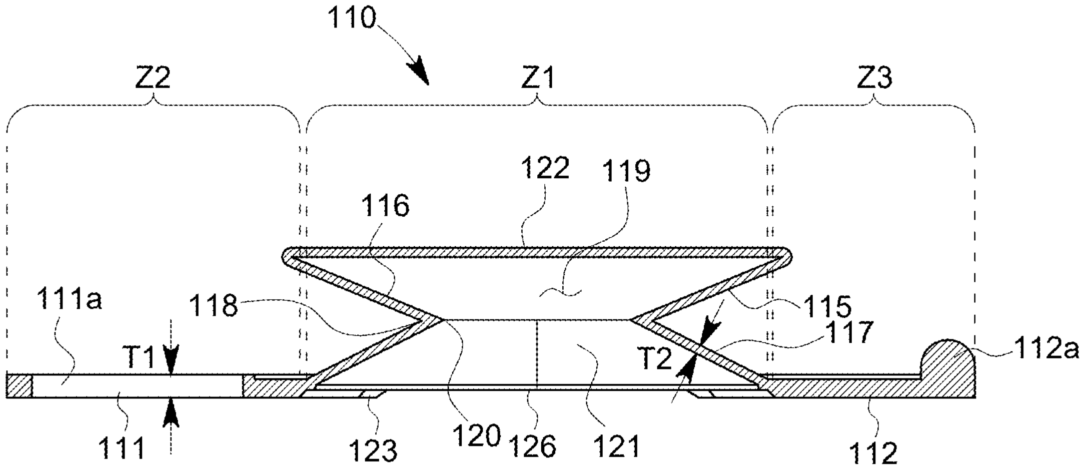
FIG. 4A is a longitudinal sectional view of the cap of FIG. 1, taken through the section line 4A-4A of FIG. 1.
Figure 4B:
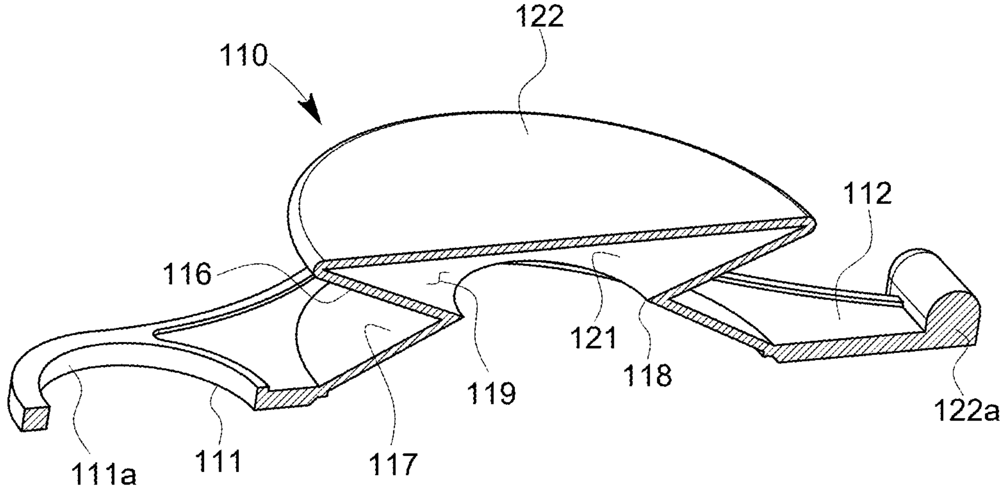
FIG. 4B is a perspective sectional view of the cap of FIG. 1, taken through the section line 4A-4A of FIG. 1.

According to preferred embodiments, the cap 110 is configured with one or more zones that provide the cap with different degrees of stretchability within those zones. For example, one or more zones at the end of the cap 110, such as at the grasping ends 111, 112 may be strengthened. According to preferred embodiments, both grasping ends 111, 112 comprise strengthened areas or zones. The strengthened areas or zones are not as stretchable as the engaging area of the cap 110, such as the body 115 that is stretched to fit over a structure. Strengthening preferably is accomplished using a thicker portion of material, but alternatively could be done in other ways, such as for example, using a different material or composition in those areas, adding reinforcing ribs or other structure to impart strength. According to an alternate embodiment, the cap may be configured with a cap body that is stretchable or elastic and has one or more ends connected to the body to aid in grasping and stretching. According to a preferred embodiment, the cap is structured to have thicker portions at each of its ends to provide more strength. The central portion or body 115 maintains stretchability and elasticity for installation over an opening of a structure, such as a glass smoking device, as well as to return the cap from its stretched condition to rebound onto an engaging contact with the structure to cover the structure opening (see e.g., FIGS. 6E and 6F). According to the exemplary embodiment depicted, the cap 110 is configured to have different portions of the cap vary in thickness. This allows for embodiments to be constructed using the same material, while providing for suitable strength and elastic properties. For example, in FIG. 2, the cap body 115 comprises a central portion disposed between the two grasping portions or ends 111, 112, and includes the opening 121. The body 115 is shown connected to first and second side portions shown comprising the grasping ends 111, 112, respectively. Referring to FIG. 2, the grasping ends 111, 112 are shown having a thickness T1, and the body portion lower edges 126, 127 are each shown having a thickness T2 that is less than that thickness T1 of the grasping ends 111, 112. As shown in FIGS. 4A and 4B, the thickened areas of the grasping ends 111, 112 are shown, and the body 115 is shown with walls 116, 117 that are thinner than the grasping end thicknesses. The central zone Z1 represents a zone where the stretchability is greater versus each of the end zones Z2 and Z3. The end zones Z2 and Z3 have stretchability that is not as great as Z1. The thickened areas of the cap 110 provide additional reinforcement to prevent or minimize tearing. Tearing prevention or minimization thereof may be preferably achieved by one or more or combinations of mechanisms: 1. Thicker material by itself; and/or 2. Coercing the stretching of the cap to occur in a specified area or zone, such as for example the zone Z1 which represents an area of the cap that is stretchable (and which may be more stretchable than other areas of the cap). In addition, by having the thickened areas (for example, in the grasping portions 111, 112), the cap 110 will deform more in zone Z1 than it will in the thickened areas of each end zone Z2 and Z3 and the respective grasping ends 111, 112. The configuration of the cap with the zones of varying thickness, e.g., Z1 versus Z2 and Z3, reduces the risk of overstretching areas. Accordingly, although the thicknesses of the grasping ends 111 and 112 are depicted having a similar thickness, the ends may be provided with different thicknesses, if desired. Preferably, at least some area or portion of the cap, which in the exemplary embodiment is the body 115, is configured to possess suitable stretchability or elasticity to stretch over an opening of a structure to be covered, and rebound to sealingly engage and mount onto the structure, as well as to be released from engagement with the structure.

Figure 6A:
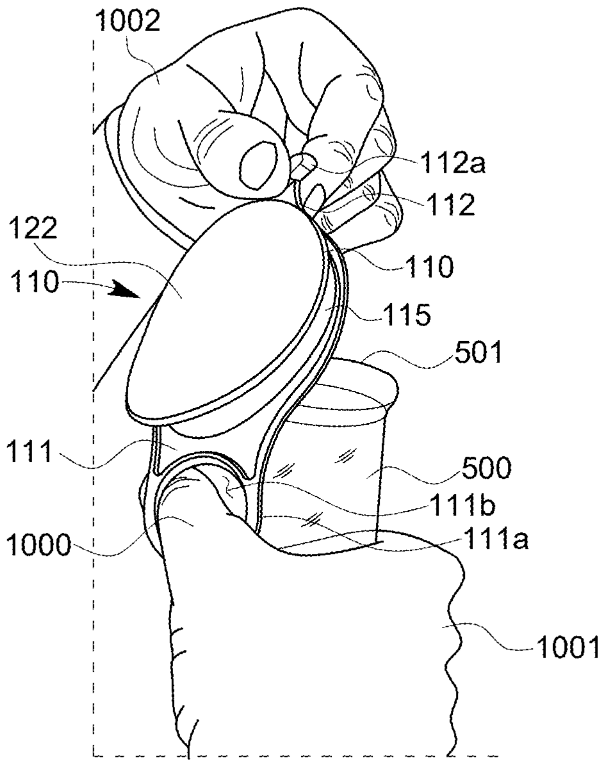
FIG. 6A is a perspective view of the cap of FIG. 1 shown being applied to a mouthpiece of a smoking device.
Figure 6B:
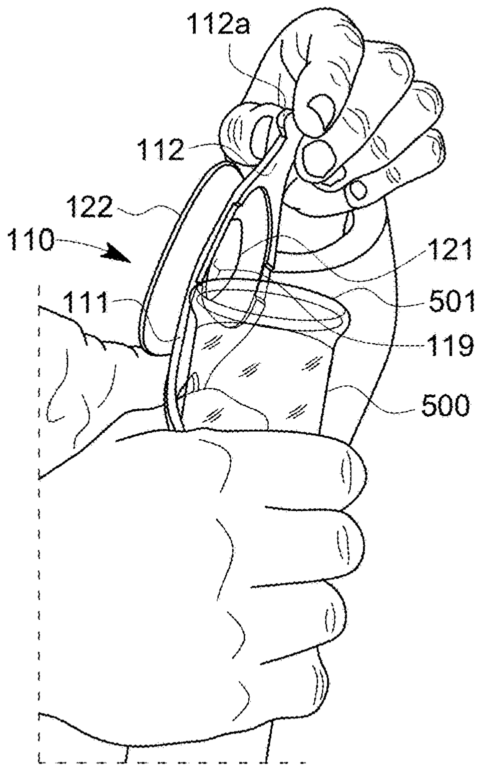
FIG. 6B is a perspective view looking from the side showing the cap being applied to the mouthpiece of the smoking device.
Figure 6C:
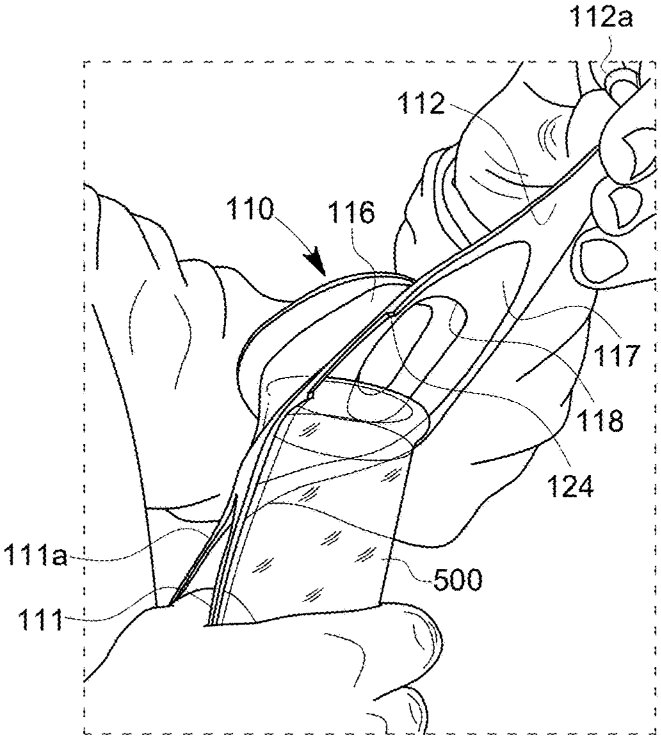
FIG. 6C is a perspective view looking from the side, at the cap being applied in FIG. 6B, being stretched over the mouthpiece of the smoking device.

In the embodiment illustrated, the thickened areas also allow comparatively more stretching of the cap body 115, which comprises the portion of the cap 110 that is required to stretch over the structure, such as the mouthpiece of a glass smoking apparatus, as shown in FIG. 6C.

Figure 5:
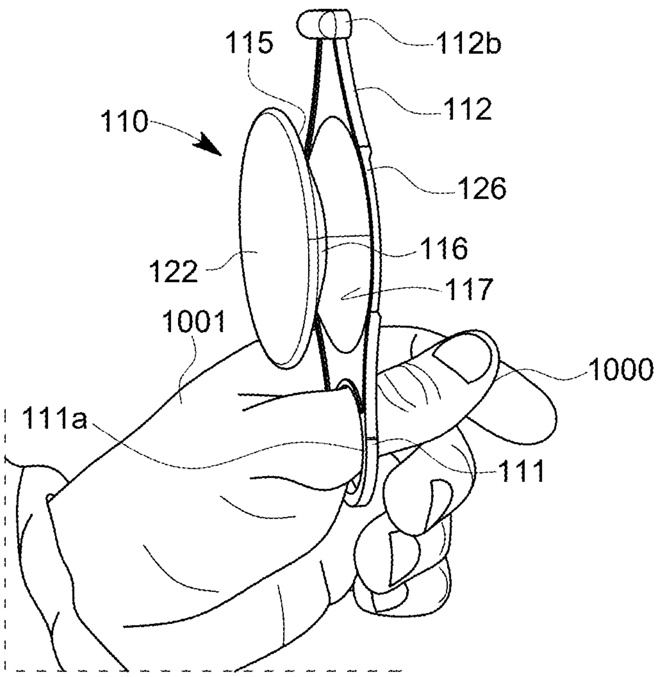
FIG. 5 is a perspective view of the cap of FIG. 1, shown with a hand of an individual grasping the opening or ring end of the cap device.
Figure 6D:
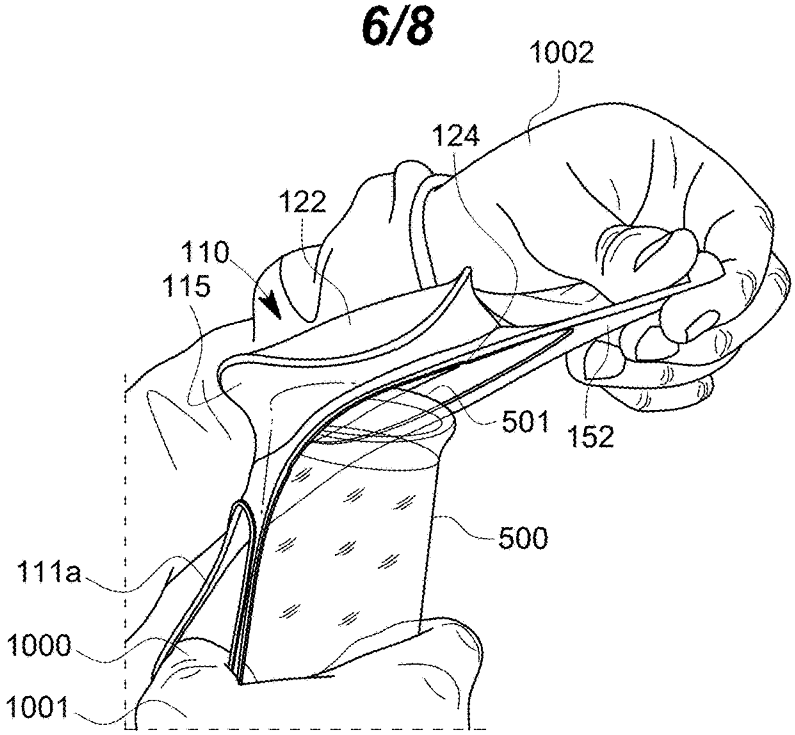
FIG. 6D is a perspective view looking from the side, at the cap being lowered over the mouthpiece of the smoking device.
Figure 6E:
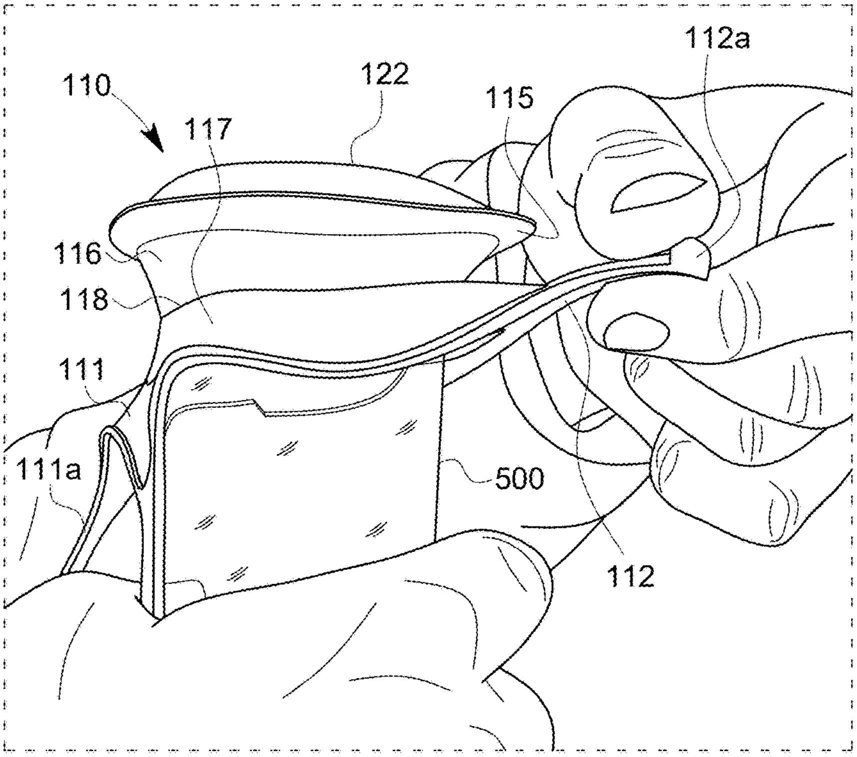
FIG. 6E is a perspective view looking from the side, at the cap being lowered over the mouthpiece of the smoking device and being released to engage the side of the mouthpiece.
Figure 6F:
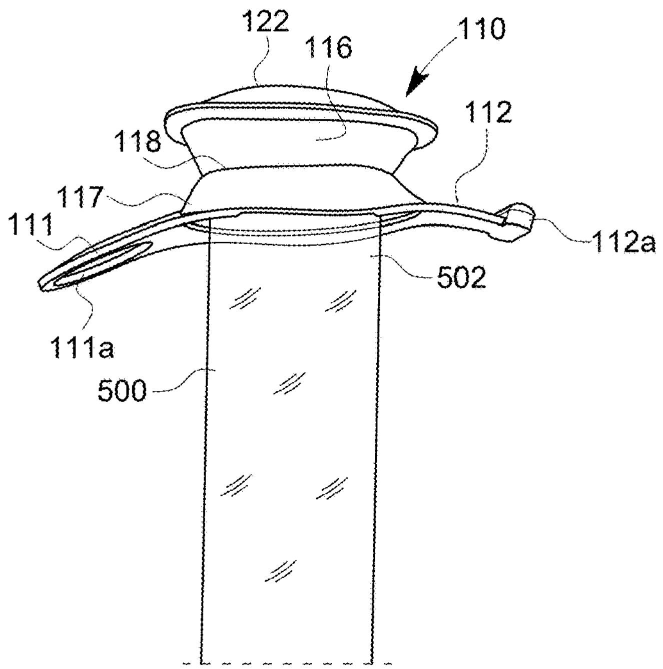
FIG. 6F is a perspective view looking from the side, of the cap in an installed condition on the device.
Figure 7:
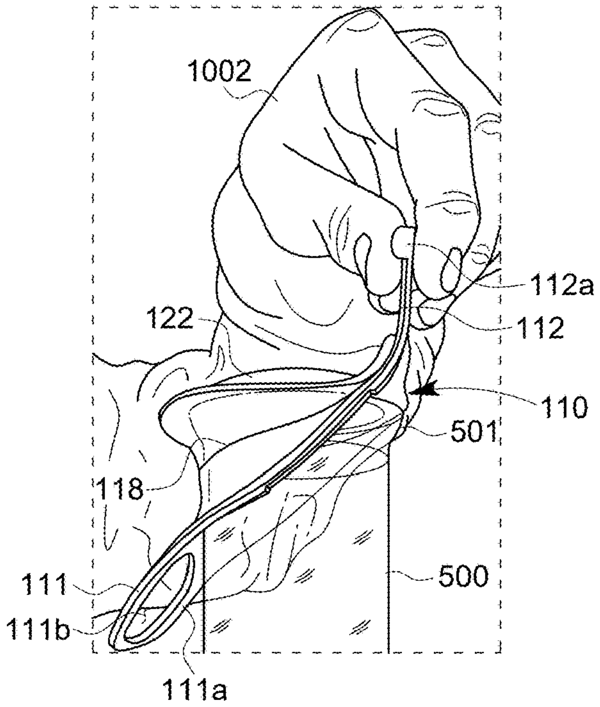
FIG. 7 is a perspective view looking from the side of the cap being removed from the mouthpiece.

The cap 110 is preferably applied to a structure to cover an opening of the structure as shown in FIGS. 6A through 6E. In the illustrations shown, the structure comprises a glass smoking apparatus or device such as the pipe 500. According to a preferred use of the cap 110, the user will first empty any existing liquid from the smoking device 500. Next, a cleaner, such as for example, a liquid cleaning solution (as desired for the type of cleaning) is added to the pipe interior. The user then selects an appropriately sized cap 110 based on the dimensions of the opening to be covered. As depicted in FIG. 5, the user places the user's thumb 1001 through the loop opening 111*b* of the loop 111*a* to stabilize the cap 110 and keep the cap in place during gripping of the pipe 500. As shown in FIG. 6A, the user preferably will grip the smoking device, the pipe 500, with the same hand 1000 that the user uses to grasp the ring 111*a* or loop opening 111*b* of the cap device 110. The user will then use another body part, such as the user's other hand 1002, or the user's teeth, to hold the other end of the cap (e.g., the end 112 opposite the ring end), and stretch the cap over the smoking device opening 501 (or device mouthpiece). This maneuver stretches the cap body 115 and expands the cap opening 121, allowing the cap opening to more easily fit over the device opening 501. The cap 110 then, once stretched over the smoking device opening 501, is released or allowed to recede back toward the opening 501, where it engages the glass smoking device and clings to the wall 502 of the glass smoking device (see FIG. 6F). FIG. 6A shows the cap 110 being partially installed by placement over the opening 501 of the pipe 500. The user is using two hands in this example. As shown in FIG. 6B, the cap 110 is held at one end (the loop end) and is stretched to align the cap opening 121 with the edge of the pipe opening 501. In this example, the cap is stretched by pulling on the second end or second grasping end 112, and preferably the tab 112*a*. Referring to FIGS. 6C and 6D, the further stretching of the cap 110 positions the cap 110 over the pipe 500 and pipe opening 501, whereupon the cap is pulled over the opening 501, and covers the opening. As shown in FIG. 6E, the top surface 122 of the cap is stretchable and is raised to engage with the edge of the pipe that forms the pipe opening 501. The edge of the pipe is positioned in the cap opening 121 and into the open space 119 (see FIG. 2). In FIG. 6E the cap is installed on a structure, which in this example, is the glass smoking pipe 500. Removal of the cap from a structure involves a reversal of the last step, which is shown in FIG. 7 where one of the grasping ends 111, 112 is lifted to expose the smoking device opening 501 and release the cap from its engagement with the pipe 500. In the exemplary depiction illustrated, the user is shown lifting the second grasping portion 112 by the tab 112*a* to remove the cap. The cap allows for a seal to be provided to maintain the cleaning solution within the pipe 500. Although the pipe may have one or more additional openings (not shown), those one or more additional openings are also covered with the cap in a similar manner to seal the openings, and prevent or minimize any cleaning solution from escaping during the cleaning process. Where the one or more openings are sufficiently larger or smaller to require a different size cap, then a different size cap may be used. The cap 110 preferably is designed to install to cover a range of sizes of openings and structures, due to its stretchability. However, where the cap opening is too small or too large, even when stretched, a different size cap may be used.

The cap 110 is preferably made of a flexible material that can be stretched to maneuver the device onto a structure, such as a glass smoking device, and cover the opening of the structure. The material also is waterproof and is resistant to cleaners and residues that may come in contact with the cap. The flexible material preferably also after stretching recedes, and is biased to return to its unstretched condition when the stretching force is released or lessened. When the cap 110 is fitted over the smoking device opening 501 and the stretching force is lessened or released, then the cap 110 engages the side wall 502 or neck of the structure 500 onto which the cap 110 is installed. An example of a suitable material for the cap is silicone. An example of material for the cap is silicone having a durometer of 30 Shore A. The cap may also be integrally molded from a single piece of suitable material. Alternatively, the cap may be provided in sections with at least the body portion being stretchable, and with other sections comprising the end portions connected to the body portion, where the connected end portions provide grasping locations, e.g., to hold an end of the cap at a fixed location on a structure, while using the other cap end to pull and stretch the cap over the structure.

Figure 8:
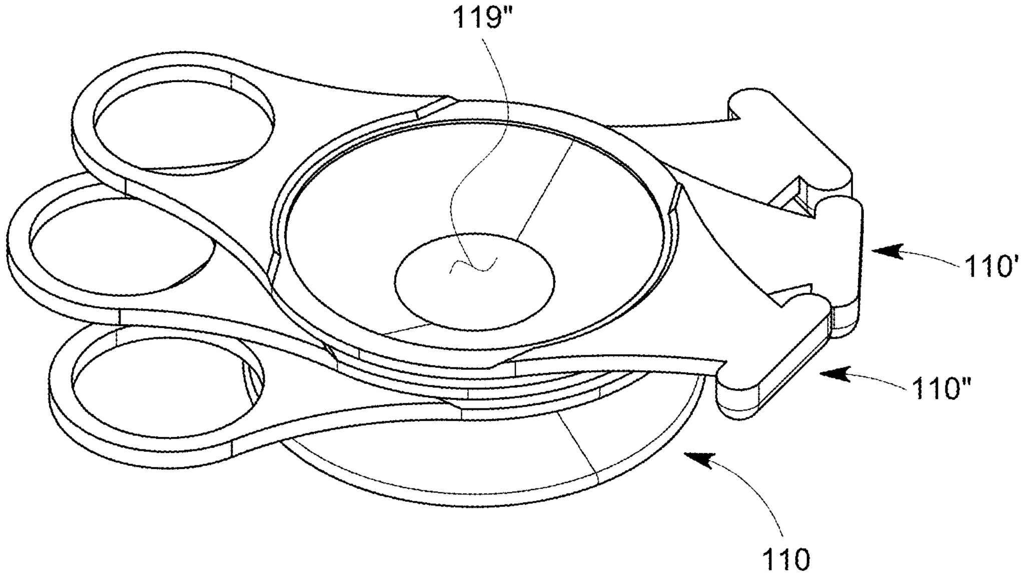
FIG. 8 is a perspective view, looking from the bottom, of three caps of varying sizes stacked inside one other.

Referring to FIG. 8, a nesting arrangement is shown in which a plurality of caps, including caps of various sizes, may be received in the top portion of other caps. The first cap 110 is shown with a second cap 110', and a third cap 110". In this example, the caps 110, 110', 110" are of different sizes, but could be sizes other than what is shown (e.g., same sizes, two of the same size, one different size, or the like). The nesting feature allows the inventive caps to be releasably secured together for ease of storage, transport from one location to another, and/or to prevent potential loss or mislocating one or more of the caps. The first cap 110 is shown receiving a portion of the smaller second cap 110' therein.

At least a portion of body of the second, smaller cap 110' is inserted into the opening 121 of the first cap 110, and is situated in the first cap body space 119. The second cap body preferably is held by the constricted area 118 of the receiving first cap body which covers a portion of the second, smaller cap 110' and holds it. Another cap, shown as the third cap 110", which in the illustrated example is a cap 110" smaller than each of the first cap 110 and second cap 110', is shown nested in the second cap 110' in the same manner as described above in connection with the nesting of the second cap 110' in the first cap 110. The body space 119" of the third cap 110" is shown, and may even receive another cap, if desired.

While the invention is described through the above-described exemplary embodiments, it will be understood by those of ordinary skill in the art that modifications to, and variations of, the illustrated embodiments may be made without departing from the inventive concepts disclosed herein. Furthermore, disclosed aspects, or portions of these aspects, may be combined in ways not listed above. Accordingly, the invention should not be viewed as being limited to the disclosed embodiments, as the description is illustrative and is not to be construed as limiting the scope of the invention.

What is claimed is:

1. A cap for sealing the opening of a structure comprising:

a) a body comprising a first body wall and a second body wall, and a top wall, the first body wall having a first end and a second end, the first end joining with the top wall and being closed by the top wall, and the second end being an open end; wherein the second body wall has a first end and a second end and is open at both ends, the second body wall second end having a circumferential edge, wherein the second end of the first body wall joins with the first end of the second body wall to form a constriction;

b) an opening being located at the constriction;

c) a first grasping portion and a second grasping portion, the first grasping portion and the second grasping portion each being disposed at the second end of the second body wall, joining the circumferential edge on opposite sides thereof;

d) wherein the first body wall is angled inwardly between its first end and its second end, and wherein the second body wall is angled outwardly between its first end and its second end;

e) the circumferential edge comprising a pair of opposing shoulders and a pair of opposing circumferential edge portions separating the opposing shoulders along the circumferential edge, one of the opposing shoulders provided where the first grasping portion joins the circumferential edge, the other of the opposing shoulders provided where the second grasping portion joins the circumferential edge, the circumferential edge portions each having a thickness less than a thickness of the opposing shoulders;

f) wherein at least the body is constructed from a resilient material; and g) wherein the body is stretchable to expand a diameter of the opening.

2. The cap of claim 1, wherein at least one of the first grasping portion or the second grasping portion comprises a grasping element.

3. The cap of claim 1, wherein at least one of the grasping portions is elastic and stretchable, and wherein the body is more stretchable relative to the stretchability of the at least one grasping portion that is elastic and stretchable.

4. The cap of claim 1, wherein the one grasping portions are elastic and stretchable, and wherein the body is more stretchable relative to the stretchability of the grasping portions.

5. The cap of claim 1, wherein the first grasping portion and the second grasping portion each have a thickness, wherein the first body wall has a thickness, wherein the second body wall has a thickness, and wherein the thickness of each of the first body wall and the second body wall is less than the thickness of at least one of the first grasping portion and the second grasping portion.

6. The cap of claim 5, wherein at least one of the grasping portions is a ring hole comprising a reinforced loop formed by a loop wall, and wherein said loop wall has a thickness that is greater than the thickness of the first body wall and the second body wall.

7. The cap of claim 1, wherein said cap body is made of an elastic material.

8. The cap of claim 7, wherein at least one of the grasping portions is made of an elastic material.

9. The cap of claim 1, wherein the body and the grasping portions are made of an elastic material.

10. The cap of claim 1, wherein the first grasping portion comprises a first grasping end, and wherein the second grasping portion comprises a second grasping end.

11. The cap of claim 1, wherein the first grasping portion comprises one of a loop and a tab.

12. The cap of claim 1, wherein the first grasping portion comprises a loop.

13. The cap of claim 12, wherein the second grasping portion comprises a tab.

14. The cap of claim 13, wherein the body has a wall thickness, and wherein the tab is reinforced with additional thickness so the tab is thicker than the wall thickness of the body.

15. The cap of claim 1, wherein the resilient material is silicone.

16. The cap of claim 15, wherein the silicone has a durometer of 30 Shore A.

17. The cap of claim 1, wherein at least one of the grasping portions comprises a ring hole.

18. The cap of claim 17, wherein said ring hole comprises a reinforced loop, the loop having a diameter of an inch.

19. The cap of claim 1, wherein said cap comprises a single piece of elastic material.

20. The cap of claim 1, wherein the diameter of the opening located at the constriction is a first diameter, wherein the open second end of the second body wall defines an opening having a second diameter larger than the first diameter.

21. A system comprising a plurality of caps according to claim 1, wherein said plurality of caps are nested to fit inside and detach from and attach to one another.

22. A method for applying a cap to seal an opening of a structure, the method comprising:

a) providing a cap comprising:

i) a body comprising a first body wall and a second body wall, and a top wall, the first body wall having a first end and a second end, the first end joining with the top wall and being closed by the top wall, and the second end being an open end; wherein the second body wall has a first end and a second end and is open at both ends, the second body wall second end having a circumferential edge, wherein the second end of the first body wall joins with the first end of the second body wall to form a constriction;

ii) an opening being located at the constriction;

iii) a first grasping portion and a second grasping portion, the first grasping portion and the second grasping portion each being disposed at the second end of the second body wall, joining the circumferential edge on opposite sides thereof;

iv) wherein the first body wall is angled inwardly between its first end and its second end, and wherein the second body wall is angled outwardly between its first end and its second end;

v) the circumferential edge comprising a pair of opposing shoulders and a pair of opposing circumferential edge portions separating the opposing shoulders along the circumferential edge, one of the opposing shoulders provided where the first grasping portion joins the circumferential edge, the other of the opposing shoulders provided where the second grasping portion joins the circumferential edge, the circumferential edge portions each having a thickness less than a thickness of the opposing shoulders;

vi) wherein at least the body is constructed from a resilient material; and vii) wherein the body is stretchable to expand a diameter of the opening; and viii) wherein the first grasping portion comprises a ring having a ring hole, and wherein the second grasping portion comprises a tab;

b) grasping the ring via the ring hole;

c) grasping the structure having the opening to be covered sealed by the cap while continuing to grasp the ring;

d) with the first grasping portion and ring acting as an anchor point, grasping the tab and stretching the cap by pulling the second grasping portion away from the first grasping portion to expand the cap body;

e) positioning the expanded stretched cap body over the opening of the structure; and f) releasing the tab, allowing the cap body to conform to the structure to cover the opening and create a seal.

23. The method of claim 22, further comprising the step of removing the cap by grasping the tab and pulling the tab away from the structure opening.

24. The method of claim 22, wherein the cap is made of silicone.

25. The method of claim 22, wherein the structure has a second opening, wherein the method includes providing a second cap comprising:

i) a body comprising a first body wall and a second body wall, and a top wall, the first body wall having a first end and a second end, the first end joining with the top wall and being closed by the top wall, and the second end being an open end; wherein the second body wall has a first end and a second end and is open at both ends, the second body wall second end having a circumferential edge, wherein the second end of the first body wall joins with the first end of the second body wall to form a constriction;

ii) an opening being located at the constriction;

iii) a first grasping portion and a second grasping portion, the first grasping portion and the second grasping portion each being disposed at the second end of the second body wall joining the circumferential edge on opposite sides thereof;

iv) wherein the first body wall is angled inwardly between its first end and its second end, and wherein the second body wall is angled outwardly between its first end and its second end;

v) the circumferential edge comprising a pair of opposing shoulders and a pair of opposing circumferential edge portions separating the opposing shoulders along the circumferential edge, one of the opposing shoulders provided where the first grasping portion joins the circumferential edge, the other of the opposing shoulders provided where the second grasping portion joins the circumferential edge, the circumferential edge portions each having a thickness less than a thickness of the opposing shoulders;

vi) wherein at least the body is constructed from a resilient material; and vii) wherein the body is stretchable to expand the diameter of the opening; and viii) wherein the first grasping portion comprises a ring having a ring hole, and wherein the second grasping portion comprises a tab;

and repeating said steps b) through f) to apply the second cap to the second opening of the structure.

* * * * *